US010931919B2

(12) United States Patent
Tsui et al.

(10) Patent No.: US 10,931,919 B2
(45) Date of Patent: Feb. 23, 2021

(54) VIDEO CONFERENCE SYSTEM, VIDEO CONFERENCE APPARATUS, AND VIDEO CONFERENCE METHOD

(71) Applicant: Optoma Corporation, New Taipei (TW)

(72) Inventors: Yuan-Mao Tsui, New Taipei (TW); Shou-Hsiu Hsu, New Taipei (TW); Yu-Cheng Lee, New Taipei (TW)

(73) Assignee: Optoma Corporation, New Taipei (TW)

( * ) Notice: Subject to any disclaimer, the term of this patent is extended or adjusted under 35 U.S.C. 154(b) by 0 days.

(21) Appl. No.: 16/866,554

(22) Filed: May 5, 2020

(65) Prior Publication Data

US 2020/0358982 A1    Nov. 12, 2020

(30) Foreign Application Priority Data

May 8, 2019    (CN) .......................... 201910379151.5

(51) Int. Cl.
*H04N 7/15*       (2006.01)
*G06T 7/73*       (2017.01)
(Continued)

(52) U.S. Cl.
CPC ........... *H04N 7/15* (2013.01); *G06K 9/00228* (2013.01); *G06K 9/00335* (2013.01); *G06K 9/00362* (2013.01); *G06T 7/73* (2017.01); *G06T 7/80* (2017.01); *G10L 25/51* (2013.01); *H04N 5/23238* (2013.01); *H04N 5/2628* (2013.01); *H04N 21/4316* (2013.01);
(Continued)

(58) Field of Classification Search
CPC .......... H04N 7/15; H04N 5/262; H04N 5/232; H04N 5/445; G06K 9/00; G06T 7/73; G06T 7/80; H04R 3/00; H04R 1/40; H04R 29/00; G10L 26/51
USPC ........................................... 348/14.01–14.16
See application file for complete search history.

(56) References Cited

U.S. PATENT DOCUMENTS 6,593,956 B1 * 7/2003 Potts ..................... G01S 3/7865
                                                                348/14.09
9,621,795 B1    4/2017 Whyte et al.
(Continued)

FOREIGN PATENT DOCUMENTS

CN    206575514    10/2017

*Primary Examiner* — Melur Ramakrishnaiah
(74) *Attorney, Agent, or Firm* — JCIPRNET

(57) ABSTRACT

A video conference system, a video conference apparatus and a video conference method are provided. The video conference system includes a video conference apparatus and a display apparatus. The video conference apparatus includes an image detection device, a sound source detection device, and a processor. The image detection device obtains a conference image of a conference space. When the sound source detection device detects a sound generated by a sound source in the conference space, the sound source detection device outputs a positioning signal. The processor receives the positioning signal, and determines whether a real face image exists in a sub-image block of the conference image corresponding to the sound source according to the positioning signal to output the image signal. The display apparatus displays a close-up conference image including the real face image according to the image signal.

36 Claims, 10 Drawing Sheets

(51) Int. Cl.

| | | |
|---|---|---|
| *H04N 5/262* | (2006.01) | |
| *H04N 5/232* | (2006.01) | |
| *G06T 7/80* | (2017.01) | |
| *G06K 9/00* | (2006.01) | |
| *H04R 3/00* | (2006.01) | |
| *H04R 1/40* | (2006.01) | |
| *G10L 25/51* | (2013.01) | |
| *H04R 29/00* | (2006.01) | |
| *H04N 21/47* | (2011.01) | |
| *H04N 21/431* | (2011.01) | |

(52) U.S. Cl.
CPC .............. *H04N 21/47* (2013.01); *H04R 1/406* (2013.01); *H04R 3/005* (2013.01); *H04R 29/005* (2013.01); *G06T 2207/10016* (2013.01); *G06T 2207/20021* (2013.01); *G06T 2207/30201* (2013.01)

(56) References Cited

U.S. PATENT DOCUMENTS

| | | | |
|---|---|---|---|
| 2007/0019066 A1* | 1/2007 | Cutler | H04N 7/142 |
| | | | 348/14.08 |
| 2009/0015658 A1* | 1/2009 | Enstad | H04N 7/15 |
| | | | 348/14.08 |
| 2011/0285807 A1 | 11/2011 | Feng | |
| 2017/0116490 A1* | 4/2017 | Han | G06K 9/00087 |

\* cited by examiner

VIDEO CONFERENCE SYSTEM, VIDEO CONFERENCE APPARATUS, AND VIDEO CONFERENCE METHOD

CROSS-REFERENCE TO RELATED APPLICATION

This application claims the priority benefit of China application serial no. 201910379151.5, filed on May 8, 2019. The entirety of the above-mentioned patent application is hereby incorporated by reference herein and made a part of this specification.

TECHNICAL FIELD

The invention relates to a remote video technology, and more particularly, to a video conference system, a video conference apparatus and a video conference method.

BACKGROUND

With the increasing demand for video conferencing, how to design a video conference device applicable to various conference scenarios in order to provide good video effects is one of the important research and development directions for the video conference device. For instance, when one end of a video conference includes one more conference members, finding a way to automatically track one or more sound sources for providing a corresponding conference image is currently one of the important technical issues that must be overcome. Further, in general, after obtaining a conference image, the conventional conference device will spend a massive amount of computation that takes a lot of processor resources to perform an image analysis on the entire captured conference image, so as to determine a location of a close-up face (a speaker). In view of this, for enabling the video conference device to achieve the effect of automatically tracking the sound source and displaying the appropriate conference image with a lower amount of computation for the image processing, solutions are provided below with reference to several embodiments.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention provides a video conference system, a video conference apparatus and a video conference method, which are capable of automatically sensing a sound source in order to provide a corresponding close-up conference image.

To achieve one, a part, or all of the objects or other objects, the video conference system of the invention includes a video conference apparatus. The video conference apparatus includes an image detection device, a sound source detection device, and a processor. The image detection device is configured to obtain a conference image of a conference space. The sound source detection device is configured to output a positioning signal when the sound source detection device detects a sound generated by a sound source in the conference space. The processor is coupled to the image detection device and the sound source detection device. The processor is configured to receive the positioning signal. After the received positioning signal is lasted for a preset time length, the processor determines whether a real face image exists in a sub-image block of the conference image corresponding to the sound source according to the positioning signal to output an image signal. The display apparatus is coupled to the video conference apparatus. The display apparatus is configured to display a close-up conference image including the real face image according to the image signal.

To achieve one, a part, or all of the objects or other objects, the video conference apparatus includes an image detection device, a sound source detection device and a processor. The image detection device is configured to obtain a conference image of a conference space. The sound source detection device is configured to output a positioning signal when the sound source detection device detects a sound generated by a sound source in the conference space. The processor is coupled to the image detection device and the sound source detection device. The processor is configured to receive the positioning signal. The processor determines whether a real face image exists in a sub-image block of the conference image corresponding to the sound source to output an image signal to a display apparatus, so that the display apparatus displays a close-up conference image including the real face image according to the image signal.

To achieve one, a part, or all of the objects or other objects, the video conference method of the invention includes the following steps of: obtaining a conference image of a conference space by an image detection device; outputting a positioning signal by a sound source detection device when the sound source detection device detects a sound generated by a sound source in the conference space; receiving the positioning signal and determining whether a real face image exists in a sub-image block of the conference image corresponding to the sound source by a processor according to the positioning signal to output the image signal; and displaying a close-up conference image including the real face image by a display apparatus according to the image signal.

Based on the above, the embodiments of the invention have at least one of the following advantages and effects. According to the video conference system, the video conference apparatus and the video conference method of the invention, the image detection device can obtain the conference image of the image detection device and the sound source detection device can detect the sound generated by the sound source in the conference space, so as to determine whether the real face image exists in the sub-image block corresponding to the sound source so the display apparatus can correspondingly display the close-up conference image including the real face image. In other words, the video conference system, the video conference apparatus, and the video conference method of the invention can automatically detect the sound source and perform an image recognition to correspondingly generate a suitable close-up conference image.

To make the above features and advantages of the invention more comprehensible, several embodiments accompanied with drawings are described in detail as follows.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
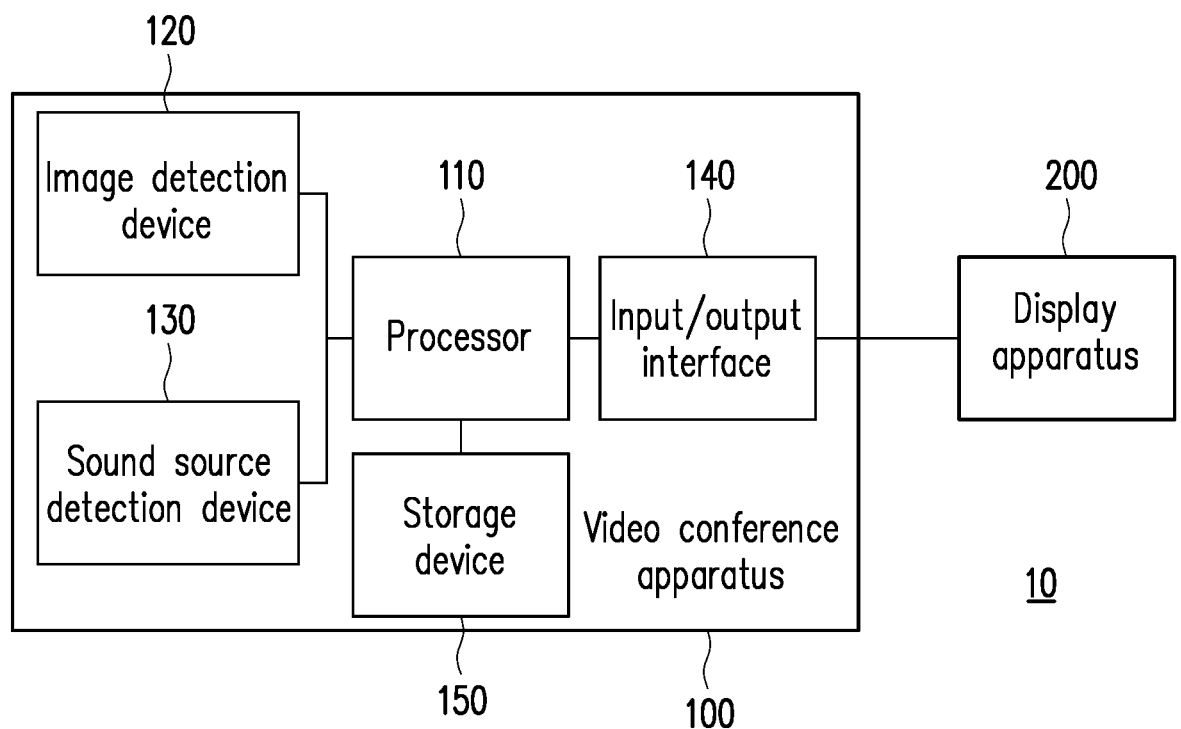
FIG. 1 is a block diagram of devices in the video conference system according to an embodiment of the invention.

FIG. 1 is a block diagram of devices in the video conference system according to an embodiment of the invention. With reference to FIG. 1, a video conference system 10 includes a video conference apparatus 100 and a display apparatus 200. In this embodiment, the video conference apparatus 100 includes a processor 110, an image detection device 120, a sound source detection device 130, an input/output interface 140 and a storage device 150. The processor 110 is coupled to the image detection device 120, the sound source detection device 130, the input/output interface 140 and the storage device 150. The processor 110 is coupled to the display apparatus 200 via the input/output interface 140. The display apparatus 200 may be, for example, a projector or a display, and the invention is not limited thereto. The input and output interface 140 may, for example, conduct transmission via the Internet by using, but not limited to Bluetooth, Wi-Fi, Zigbee, or other wireless transmission interfaces, or conduct transmission by using optical fiber or other wired transmission interfaces. In this embodiment, the video conference apparatus 100 may be one independent and movable device that can be placed at any proper location in a conference space (e.g., a center of a table, or a ceiling of a conference room) to obtain/capture a conference image of the conference space and detect a sound source in the conference space. Nonetheless, in another embodiment, the video conference apparatus 100 may also be integrated with other computer apparatuses or display apparatuses, which are not particularly limited by the invention.

In this embodiment, the processor 110 may include a central processing unit (CPU) with image data analysis and computation processing functions, or other programmable microprocessors, image processing units (IPU), graphics processing units (GPU), digital signal processors (DSP), application specific integrated circuits (ASIC), programmable logic device (PLD) for general purpose or special purpose, other similar processing circuits or a combination of the above circuits. Further, the processor 110 is coupled to the storage device 150 to store related image data, image analysis software and image processing software required to realize the video conference system and video conference method of the invention into the storage device 150 for the processor 110 to read and execute relate procedures. The storage device 150 is, for example, a memory, which may be a movable random access memory (RAM), a read-only memory (ROM), a flash memory or similar devices or a combination of the above devices.

In this embodiment, the image detection device 120 may be a 360 degree panoramic/ominidirectional camera. The image detection device 120 can be used to obtain/capture a panoramic conference image in a conference space and output the same to the processor 110. The obtained panoramic conference image in the conference space is then processed by the processor 110. In this embodiment, the sound source detection device 130 may be a microphone array. In this case, the sound source detection device 130 can be used to detect a direction of a sound source by using Direction of Arrival (DOA) for reporting the direction of the sound source and detect a direction and an intensity of a sound generated by the sound source to output a corresponding positioning signal to the processor 110. In addition, the microphone array is, for example, an arranged array with four microphones that can detect the sound source within a radius of about 5 meters. In addition, when the video conference system 10 starts to perform a video conference operation, the processor 110 can perform a calibration operation on the image detection device 120 and the sound source detection device 130 in advance, so that image coordinates of the image detection device 120 are consistent with sound coordinates of the sound source detection device 130. In other words, the processor 110 controls the image detection device 120 and the sound source detection device 130 to perform a pre-zeroing calibration operation. For instance, the processor 110 can make 0 degrees of the azimuth of the sound source detection device 130 correspond to 0 degrees of the reference coordinate axis of the conference image obtained by the image detection device 120.

In this embodiment, because the video conference apparatus 100 and the display apparatus 200 may be located in different conference spaces (e.g., a remote conference), the input/output interface 140 may include a wired or wireless communication interface for allowing the processor 110 to output an image signal to the display apparatus 200 via the communication interface. In other words, conference members may be respectively located in the different conference spaces where two video conference devices 100 may be used to perform the remote video conferences, respectively. However, in an embodiment, the video conference apparatus 100 and the display apparatus 200 may also be located in the same conference space (e.g., an indoor speech). In that case, the input/output interface 140 may include a video and audio interface for allowing the processor 110 to output the image signal to the display apparatus 200 via the video and audio interface. In addition, the processor 110 outputs a sound signal to the display apparatus 200 via the communication interface, wherein display apparatus 200 may include a sound amplification equipment (a speaker).

Figure 2:
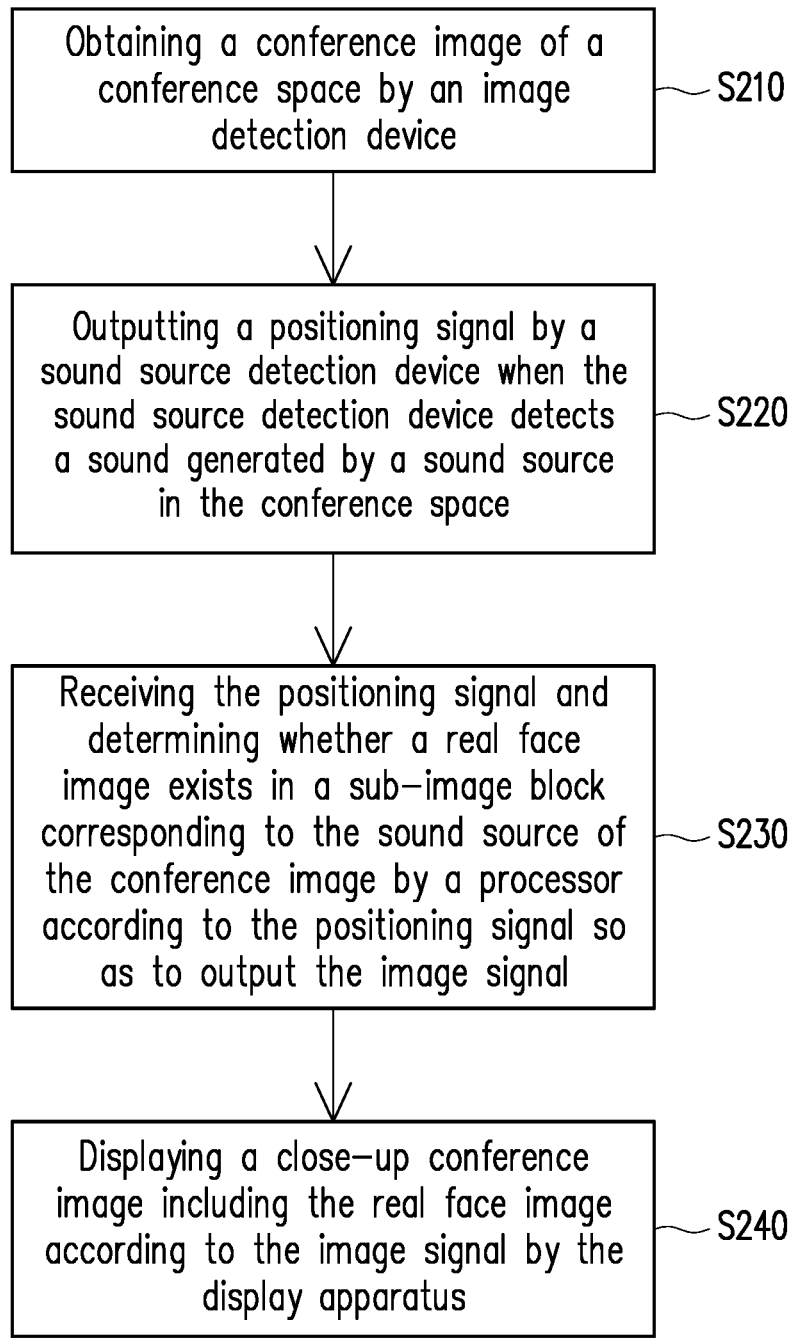
FIG. 2 is a flowchart of the video conference method according to an embodiment of the invention.

FIG. 2 is a flowchart of the video conference method according to an embodiment of the invention. With reference to FIG. 1 and FIG. 2, the video conference method in the embodiment of FIG. 2 is applicable to the video conference apparatus 100 in the embodiment of FIG. 1. In step S210, when performing a video conference, the processor 110 obtains a conference image of a conference space through the image detection device 120. In step S220, when the sound source detection device 130 detects a sound source in the conference space, the sound source detection device 130 outputs a positioning signal. In this embodiment, the sound source detection device 130 determines whether to output the positioning signal to the processor 110 by, for example, determining whether a sound intensity of the sound source exceeds a sound intensity threshold and according to thresholds of a sound lasted duration. In step S230, the processor 110 receives the positioning signal, and determines whether a real face image exists in a sub-image block of the conference image corresponding to the sound source according to the positioning signal to output the image signal. In step S240, the display apparatus 200 displays a close-up conference image including the real face image and plays the sound of the speaker according to the image signal. Accordingly, the video conference method of the present embodiment can allow the video conference apparatus 100 to automatically track the sound of the conference member, and can operate the display apparatus 200 to synchronously display a face image of the conference member who made the sound to provide a favorable video conference effect.

It should be noted that, the conference image described above is, for example, a panoramic image, and the panoramic image may be divided into a plurality of sub-image blocks. In other words, when the processor 110 of the present embodiment is analyzing whether the real face image exists in the conference image, the processor 110 perform a face image determination simply by analyzing one of the sub-image blocks corresponding to positioning signal instead of analyzing the entire conference image. In other words, the processor 110 can achieve functions of the face image determination with a lower amount of computation for the image processing. Further, a method for determining whether the real face image exists in the sub-image block in this embodiment may be, for example, a wink detection performed on the face image for determining whether the face image includes actions like winking, a mouth change or movement within a preset time interval to thereby determine whether such face image belongs to the real face image.

However, the invention is not limited in this regard. In an embodiment, the processor 110 may also determine whether the real face image exists in the sub-image block according to other methods for determining a face feature. It is worth noting that, the processor 110 can perform the calibration operation on the image detection device 120 and the sound source detection device 130 in advance, so that the image coordinates of the image detection device 120 are consistent with the sound coordinates of the sound source detection device 130. Here, because the sound source detection device 130 (the microphone array) can receive the sound form 360 degrees and the sound source detection device 130 can accurately detect a location of the sound source within approximately 20 to 30 degrees, the panoramic image (having 360 degrees) may be correspondingly divided into 12 to 18 sub-image blocks. For instance, when the sound is generated within a first sound interval (0 to 20 degrees), the processor 110 can specifically analyze a first sub-image block corresponding to the first sound interval in the captured panoramic image. In other words, the processor 110 can determine whether the real face image exists in the first sub-image block corresponding to the first sound interval according to the method for determining the face feature described above.

Figure 3A:
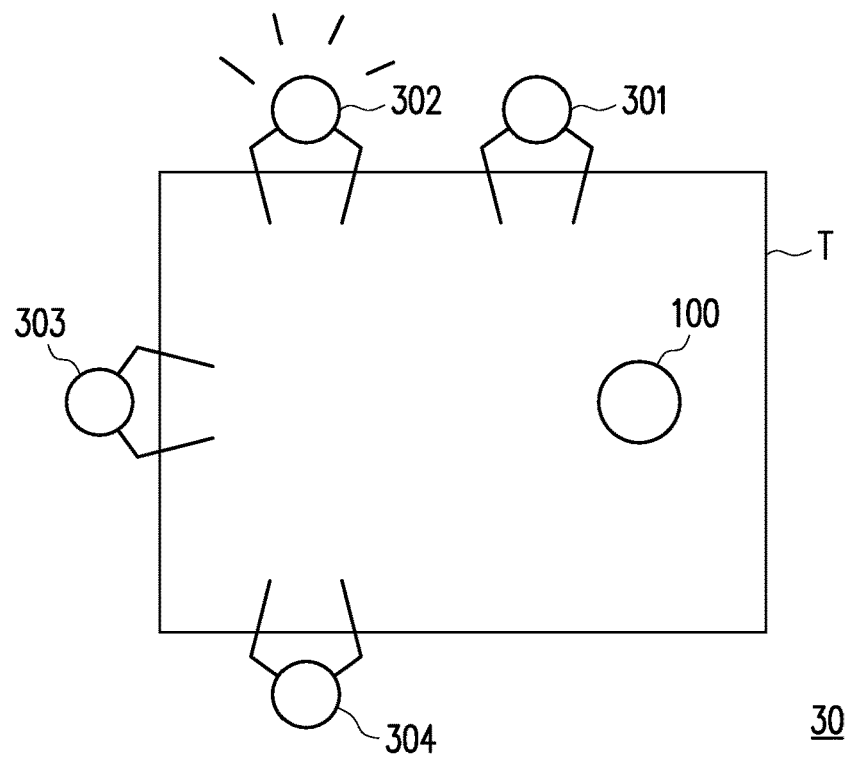
FIG. 3A is a schematic diagram of a video conference scenario according to an embodiment of the invention.
Figure 3B:
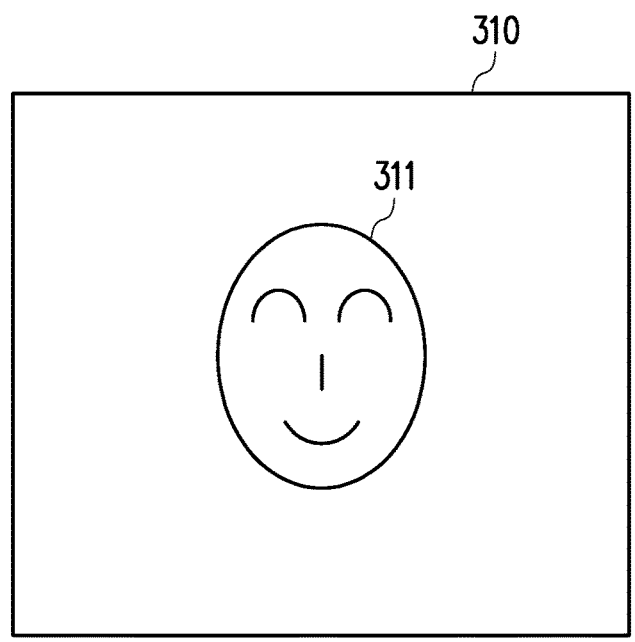
FIG. 3B is a schematic diagram of the close-up conference image according to the embodiment of FIG. 3A in the invention.

FIG. 3A is a schematic diagram of a video conference scenario according to an embodiment of the invention. FIG. 3B is a schematic diagram of the close-up conference image according to the embodiment of FIG. 3A in the invention. With reference to FIG. 1, FIG. 3A and FIG. 3B, the following description is provided with reference to one exemplary implementation scenario. In a video conference scenario 30, it is assumed that conference members 301 to 304 are seated around a table T, the video conference apparatus 100 is placed on the table T, and yet a location where the video conference apparatus 100 is placed is not limited. During a video conference, the image detection device 120 first obtains a conference image of a conference space, i.e., obtains a 360 degrees image of the surrounding of the video conference apparatus 100. Next, when the conference member 302 speaks, the sound source detection device 130 can detect a sound made by the conference member 302 (i.e., a direction from which the sound is made) and output a positioning signal. Accordingly, the processor 110 of the video conference apparatus 100 can analyze whether a real face image exists in a corresponding sub-image block of the conference image to output an image signal to the display apparatus 200. In this embodiment, the display apparatus 200 can display a close-up conference image 310 as shown by FIG. 3B. The close-up conference image 310 includes a real face image 311 of the conference member 302. It should be noted that, the real face image 311 is located at a central position of the close-up conference image 310.

However, a displaying manner of the close-up conference image of the invention is not limited to FIG. 3B. In an embodiment, when the processor 110 of the video conference apparatus 100 determines that the real face image exists in the sub-image block of the conference image corresponding to the sound source according to the positioning signal, if the processor 110 further determines that a specific object image is included around the real face image in the conference image, the processor 110 can adjust the close-up conference image, so that the close-up conference image simultaneously includes the real face image and the specific object image (or both the conference member and the specific object image simultaneously appear in the close-up conference image). In an embodiment, the specific object image may be, for example, a stylus pen, a whiteboard pen, a whiteboard, or a projection screen, and the invention is not limited thereto.

Figure 4:
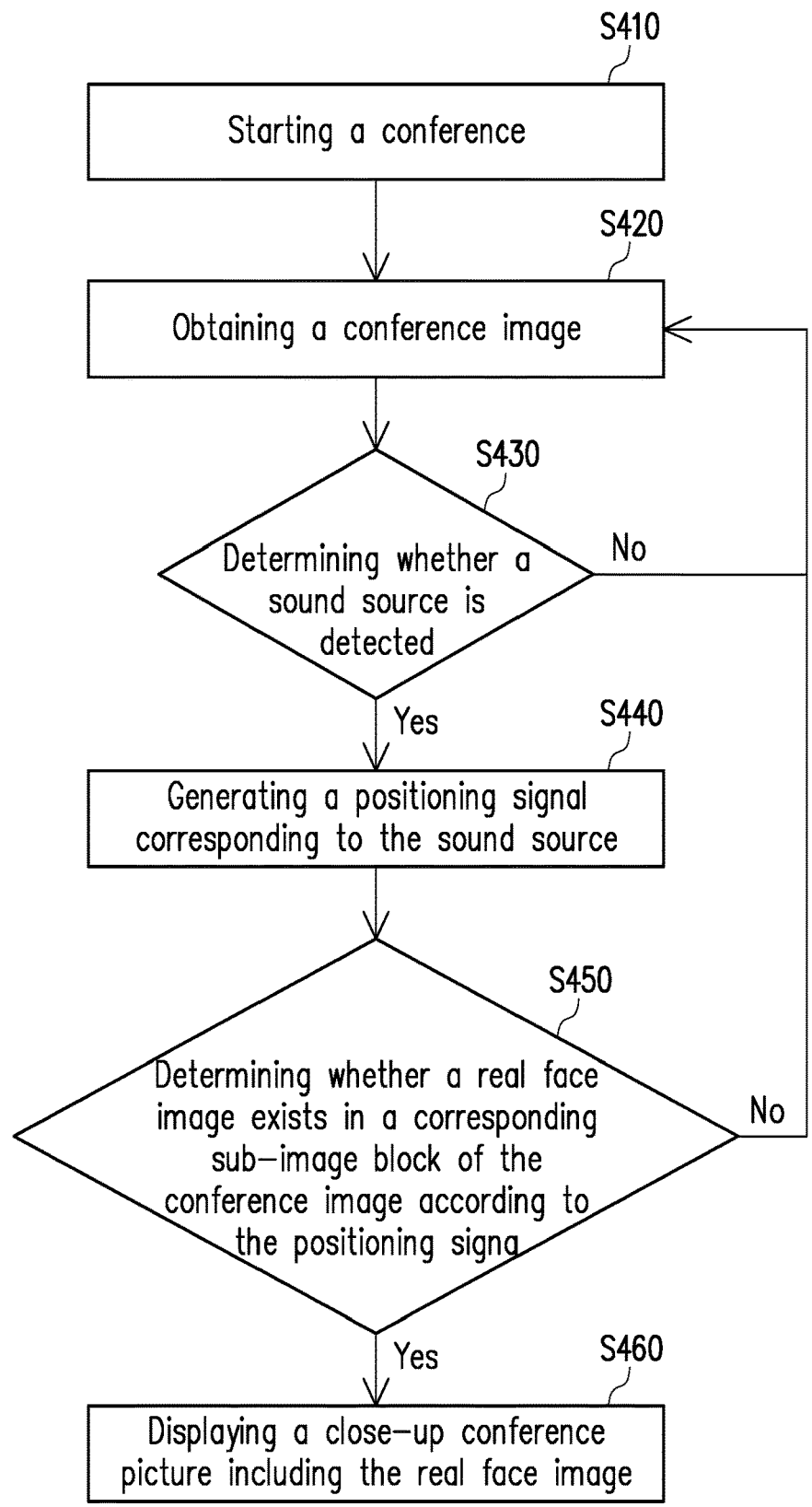
FIG. 4 is a flowchart of the video conference method according to another embodiment of the invention.

FIG. 4 is a flowchart of the video conference method according to another embodiment of the invention. With reference to FIG. 1 and FIG. 4, the video conference method in the embodiment of FIG. 4 is applicable to the video conference apparatus 100 in the embodiment of FIG. 1. In step S410, a conference is started and the video conference apparatus 100 is activated. In step S420, the processor 110 obtains a conference image through the image detection device 120. In step S430, the processor 110 determines whether a sound source is detected through the sound source detection device 130. If not, the video conference apparatus 100 re-executes step S420. If yes, the video conference apparatus 100 executes step S440. In step S440, the sound source detection device 130 generates a positioning signal corresponding to the sound source and provides the positioning signal to the processor 110. In step S450, the processor 110 determines whether a real face image exists in a corresponding sub-image block of the conference image according to the positioning signal. In other words, after the processor 110 continuously receives the positioning signal for a preset time length, the processor 110 then determines whether the real face image exists in the corresponding sub-image block of the conference image. If not, the video conference apparatus 100 re-executes step S420. If yes, the video conference apparatus 100 executes step S460. In step S460, the display apparatus 200 displays a close-up conference image including the real face image. Next, the video conference apparatus 100 can re-execute step S420 to continuously update the close-up conference image. In this way, the video conference method of the present embodiment can provide the favorable video conference effect.

Figure 5:
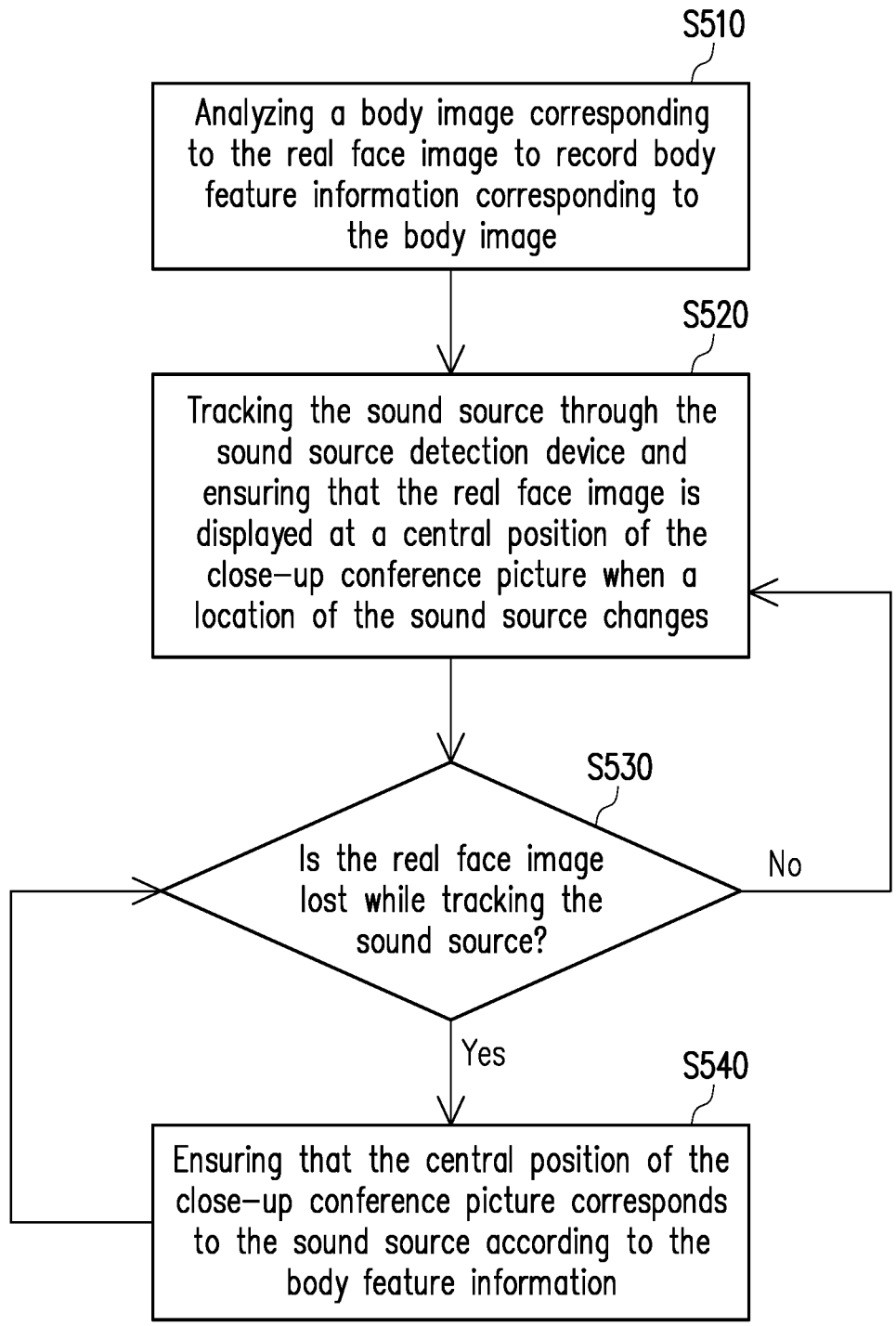
FIG. 5 is a flowchart for tracking the sound source according to an embodiment of the invention.

FIG. 5 is a flowchart for tracking the sound source according to an embodiment of the invention. With reference to FIG. 1 and FIG. 5, a method for tracking the sound source in the embodiment of FIG. 5 is applicable to the video conference apparatus 10 in the embodiment of FIG. 1. Step S510 of the present embodiment may, for example, follow step S240 of FIG. 2 or step S460 of FIG. 4. In step S510, the processor 110 analyzes a body image corresponding to the real face image to record body feature information corresponding to the body image. It means that the image detection device obtains the real face image and the body image of a person in the conference space. The processor 110 further confirms the body corresponding to the real face of the person. In step S520, the processor 110 tracks the sound source through the sound source detection device 130, and the processor 110 ensures that the real face image is displayed at the central position of the close-up conference image when a location of the sound source changes. In step S530, the processor 110 determines whether the real face image is lost while tracking the sound source. If not, the video conference apparatus 100 re-executes step S520. If yes, the video conference apparatus 100 executes step S540. In step S540, the processor 110 further ensures that the central position of the close-up conference image corresponds to the sound source according to the body feature information. In other words, while the sound source is moving, the video conference apparatus 100 of the present embodiment can continuously track the sound source, so that the close-up conference image is dynamically ensured to display the image of the conference member of the sound source.

Figure 6:
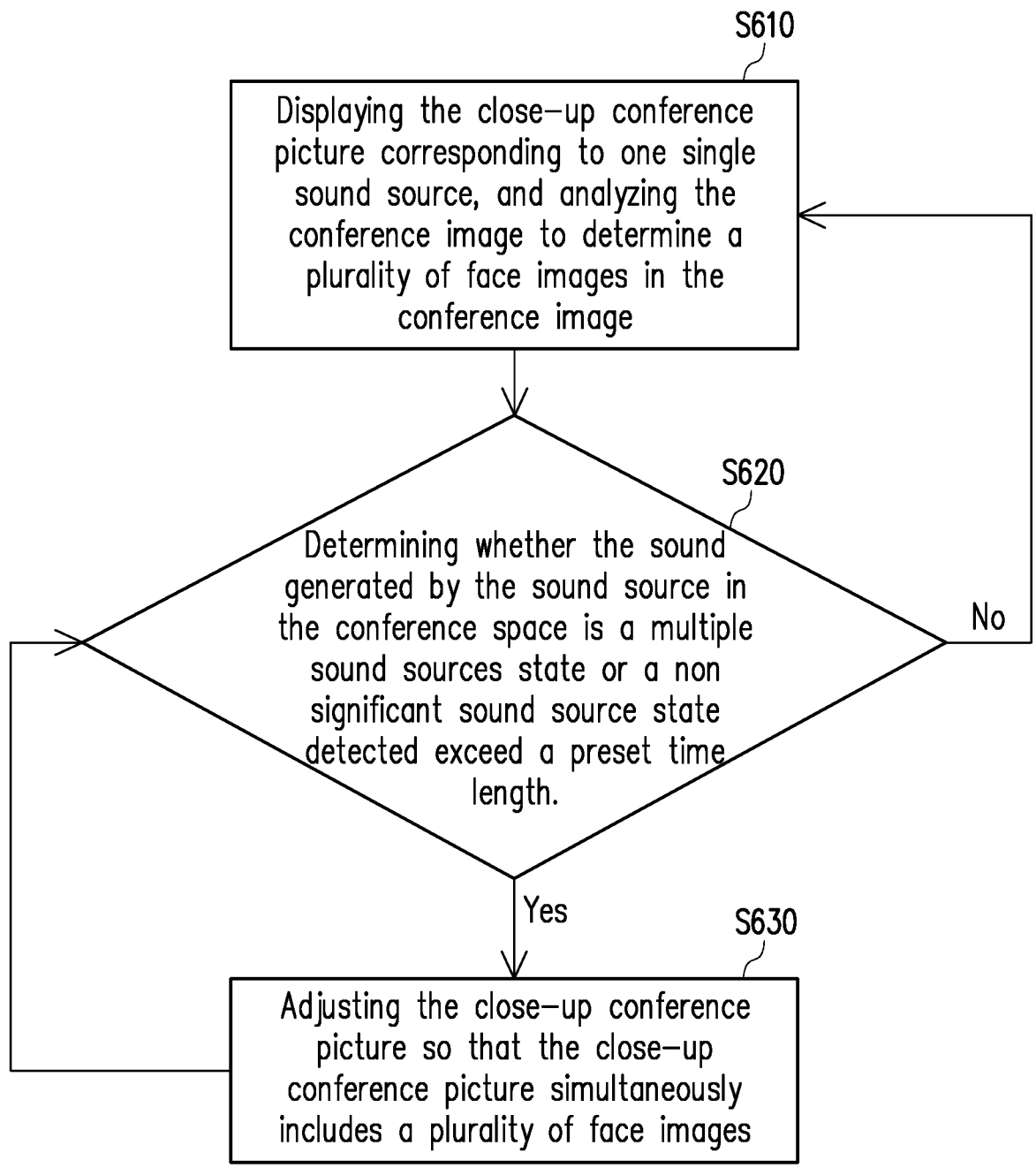
FIG. 6 is a flowchart for adjusting the conference image according to an embodiment of the invention.
Figure 7:
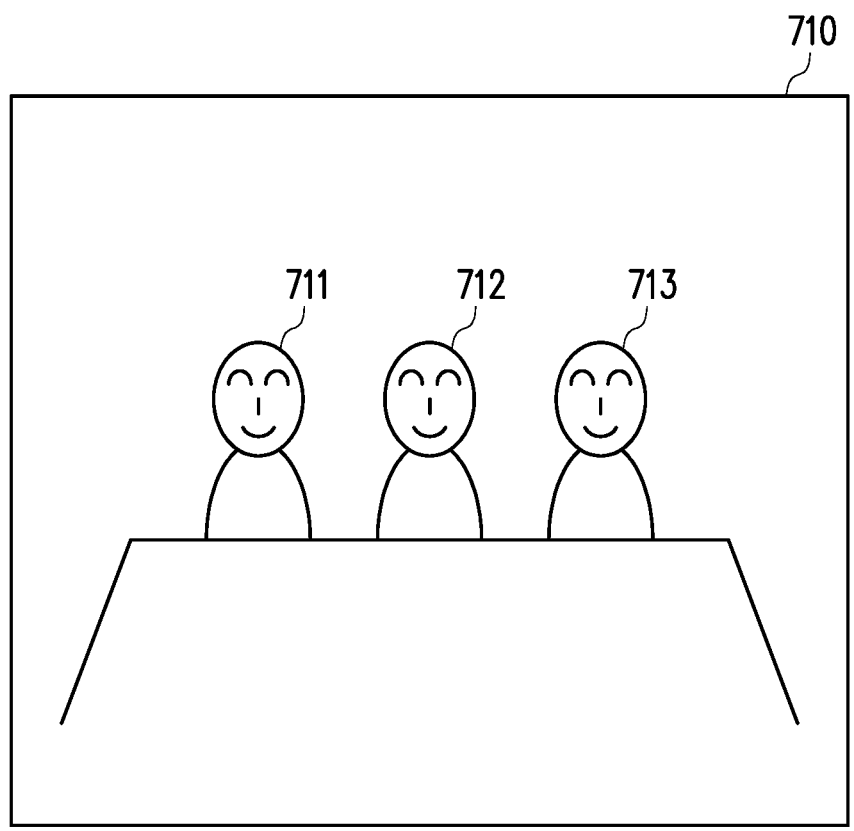
FIG. 7 is a schematic diagram of a video conference scenario according to the embodiment of FIG. 6 in the invention.

FIG. 6 is a flowchart for adjusting the conference image according to an embodiment of the invention. FIG. 7 is a schematic diagram of a video conference scenario according to the embodiment of FIG. 6 in the invention. With reference to FIG. 1, FIG. 6 and FIG. 7, a method for adjusting the conference image in the embodiment of FIG. 6 is applicable to the video conference apparatus 100 in the embodiment of FIG. 1. Step S610 of the present embodiment may, for example, follow step S240 of FIG. 2 or step S460 of FIG. 4. When a plurality of conference members are included around the sound source (e.g., the conference members are close to the sound source within a preset distance, and the preset distance is, for example, a radius of 1 to 3 meters), the video conference apparatus 100 can execute steps S610 to S630. In step S610, the display apparatus 200 displays the close-up conference image 310 corresponding to one single sound source as shown by FIG. 3B, and the processor 110 further analyzes the conference image to determine a plurality of face images in the conference image. In step S620, the processor 110 determines whether the sound generated by the sound source in the conference space is a multiple sound sources state or a non significant sound source state detected exceed a preset time length (e.g., the sound is determined as noises when having a volume lower than a preset volume threshold). If not, the video conference apparatus 100 re-executes step S610. If yes, the video conference apparatus 100 executes step S630. In step S630, the processor 110 adjusts the close-up conference image 310 into a close-up conference image 710 shown by FIG. 7, so that the close-up conference image 710 can simultaneously include a plurality of face images 711 to 713. In other words, the video conference method of the present embodiment can allow the video conference apparatus 100 to automatically adjust the close-up conference image under specific preset conditions when the conference members are included around the sound source, so that the close-up conference image can present an appropriate conference perspective.

In other embodiments, the processor can pre-analyze the conference image to determine a plurality of face images in the conference image. When the sound source detection device detects the sound generated by the sound source in the conference space for less than a preset time length, or in both a multiple sound sources state and a no obvious sound source state, the processor adjusts the close-up conference image, so that the close-up conference image covers the face images of a majority of conference members or displays an image of a preset location (e.g., the whiteboard or a face image of the conference chairman).

Figure 8:
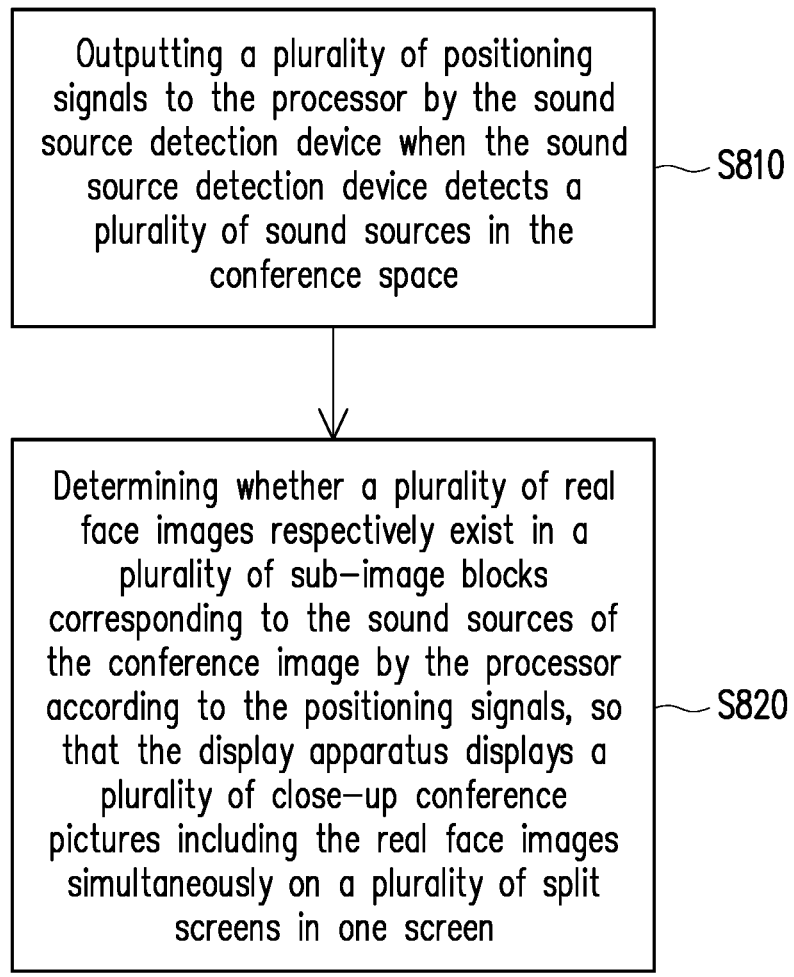
FIG. 8 is a flowchart of the video conference method according to yet another embodiment of the invention.

FIG. 8 is a flowchart of the video conference method according to yet another embodiment of the invention. With reference to FIG. 1 and FIG. 8, a method for adjusting the conference image in the embodiment of FIG. 8 is applicable to the video conference apparatus 100 in the embodiment of FIG. 1. In step S810, when a plurality of sound sources in the conference space are detected by the sound source detection device 130, the sound source detection device 130 outputs a plurality of positioning signals to the processor 110. In step S820, after the processor 110 has continuously received the positioning signals for a preset time length, the processor 110 determines whether a plurality of real face images respectively exist in a plurality of sub-image blocks of the conference image corresponding to the sound sources, so that the display apparatus 200 displays a plurality of close-up conference images including the real face images simultaneously on a plurality of split screens in one screen. In other words, under the circumstance where the sound sources exist at the same time, the sound source detection device 130 of the video conference apparatus 100 can output the positioning signals to the processor 110 so the processor 100 can perform the image analysis for the one single sound source described in each of the foregoing embodiments respectively on the sub-image blocks corresponding to the positioning signals and can display the split screen corresponding to the sound sources in the same screen. In this embodiment, each of the split screens displays the close-up conference image. In this way, the video conference method of the present embodiment can allow the video conference apparatus 100 to provide the favorable video conference effect.

Figure 9A:
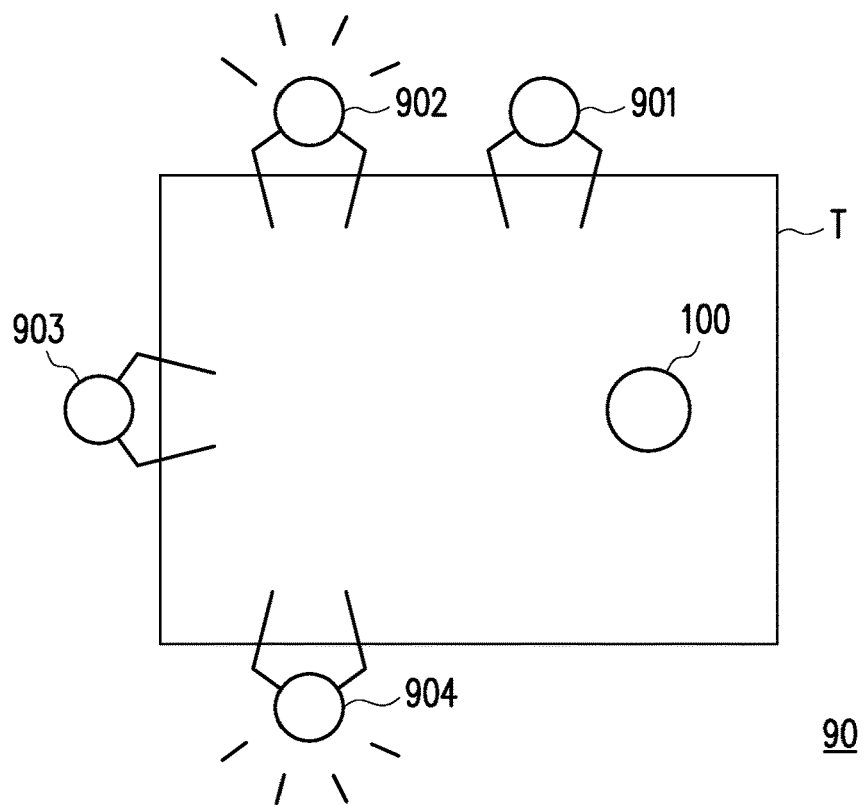
FIG. 9A is a schematic diagram of a video conference scenario according to yet another embodiment of the invention.
Figure 9B:
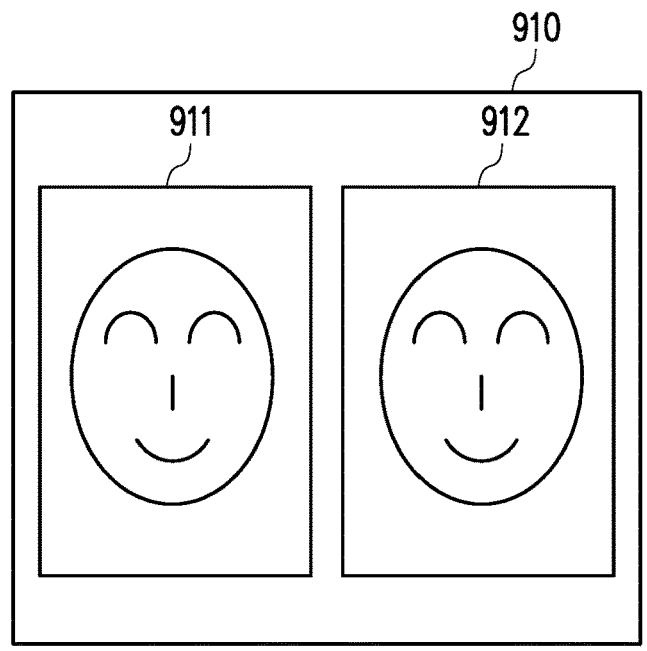
FIG. 9B is a schematic diagram of the close-up conference image according to the embodiment of FIG. 9A in the invention.

FIG. 9A is a schematic diagram of a video conference scenario according to yet another embodiment of the invention. FIG. 9B is a schematic diagram of the close-up conference image according to the embodiment of FIG. 9A in the invention. With reference to FIG. 1, FIG. 9A and FIG. 9B, the following description is provided with reference to one exemplary implementation scenario. In a video conference scenario 90, it is assumed that conference members 901 to 904 are seated around a table T, and the video conference apparatus 100 is placed on the table T. During a video conference, the image detection device 120 first obtains a conference image of a conference space. Then, when the conference members 902 and 904 speak at the same time, the sound made by each of the conference members 902 and 904 can be detected by the sound source detection device 130, which then outputs two positioning signals lasted for a preset time length, so that the processor 110 can analyze whether real face images exist in the two corresponding sub-image blocks of the conference image to output the image signal to the display apparatus 200. In this embodiment, the display apparatus 200 can display a conference image 910 as shown by FIG. 9B. The conference image 910 includes two close-up conference images 911 and 912 (on the split screens). The close-up conference image 911 includes, for example, a face image of the conference member 902, whereas the close-up conference image 912 includes, for example, a face image of the conference member 904. Also, the face images of the conference members 902 and 904 are located at central positions of the close-up conference images 911 and 912, respectively.

Figure 10:
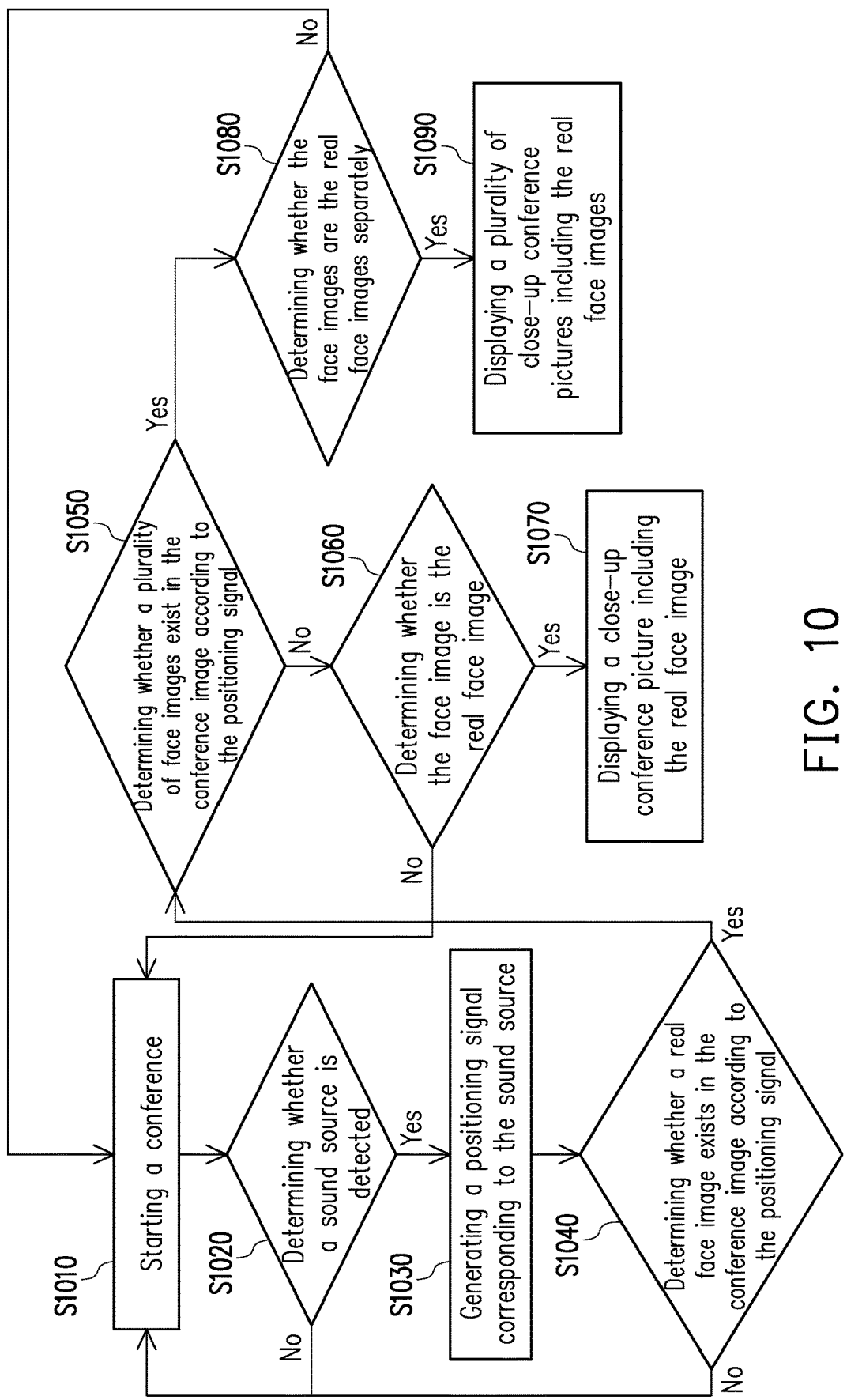
FIG. 10 is a flowchart of the video conference method according to an embodiment of the invention.

FIG. 10 is a flowchart of the video conference method according to an embodiment of the invention. With reference to FIG. 1 and FIG. 10, a method for adjusting the conference image in the embodiment of FIG. 10 is applicable to the video conference apparatus 100 in the embodiment of FIG. 1, and FIG. 10 is one embodiment referring to and integrating with some of the above embodiments. In step S1010, a conference is started, the video conference apparatus 100 is activated, and a conference image is obtained by the image detection device 120. In step S1020, the sound source detection device 130 determines whether a sound source is detected. If not, the video conference apparatus 100 re-executes step S1010. If yes, the video conference apparatus 100 executes step S1030. In step S1030, the sound source detection device 130 generates a positioning signal corresponding to the sound source. In step S1040, the processor 110 determines whether a face image exists in the conference image according to the positioning signal. If not, the video conference apparatus 100 re-executes step S1010. If yes, the video conference apparatus 100 executes step S1050.

In step S1050, the processor 110 determines whether a plurality of face images exist in the conference image according to the positioning signal. If not, the video conference apparatus 100 executes step S1060. In step S1060, whether the face image is the real face image is determined. If not, the video conference apparatus 100 re-executes step S1010. If yes, the video conference apparatus 100 executes step S1070. In step S1070, the display apparatus 200 displays a close-up conference image including the real face image. Otherwise, if the processor 110 determines the face images exist in the conference image, the video conference apparatus 100 executes step S1080. In step S1080, the processor 110 determines whether the face images are the real face images. If not, the video conference apparatus 100 executes step S1070. If yes, the video conference apparatus 100 executes step S1090. In step S1090, the display apparatus 200 displays a plurality of close-up conference images including the real face images. Accordingly, the video conference method of the present embodiment can allow the video conference apparatus 100 to automatically track the sound from each of the conference members, and can operate the display apparatus 200 to synchronously display the face image of the conference member who makes the sound to provide the favorable video conference effect.

In addition, enough teaching, suggestion, and description regarding implementations, modifications and extensions of each step in this embodiment may be obtained from the foregoing embodiments of FIG. 1 to FIG. 9B, which are not repeated hereinafter.

In summary, the embodiments of the invention have at least one of the following advantages and effects. According to the video conference system, the video conference apparatus and the video conference method of the invention, the image detection device can obtain the conference image of the conference space, and the sound source detection device can detect the sound source in the conference space so the functions of face image determination with a lower amount of computation for the image processing can be achieved. Also, with the video conference system, the video conference apparatus and the video conference method of the invention, the favorable video conference effect may be provided in both cases of the single sound source and multiple sound sources. In addition, the video conference system, the video conference apparatus and the video conference method of the invention can be combined with functions like a wink detection, a specific object image determination, a body feature information analysis and a close-up conference image adjustment to provide not only favorable but even more improved video conference functions. Furthermore, based on the invention, the video conference apparatus can perform a real face image detection without scanning all regions by the image detection device each time so the computation resources of the video conference apparatus may be saved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

The invention claimed is:

1. A video conference system comprising a video conference apparatus and a display apparatus, wherein
the video conference apparatus comprises: an image detection device, a sound source detection device, and a processor, wherein
the image detection device is configured to obtain a conference image of a conference space;
the sound source detection device is configured to detect a sound generated by a sound source in the conference space and output a positioning signal; and
the processor is coupled to the image detection device and the sound source detection device, and configured to receive the positioning signal,
wherein the processor determines whether a real face image exists in a sub-image block of the conference image corresponding to the sound source according to the positioning signal to output an image signal; and
the display apparatus is coupled to the video conference apparatus, and configured to display a close-up conference image including the real face image according to the image signal,
wherein the processor is further configured to perform a calibration operation on the image detection device and the sound source detection device, so that image coordinates of the image detection device are consistent with sound coordinates of the sound source detection device.

2. The video conference system of claim 1, wherein the real face image is located at a central position of the close-up conference image, and the processor tracks the sound source through the sound source detection device to ensure that the real face image is displayed at the central position of the close-up conference image when a location of the sound source changes.

3. The video conference system of claim 2, wherein when the processor determines that the real face image exists in the sub-image block of the conference image corresponding to the sound source according to the positioning signal, the processor further analyzes a body image corresponding to the real face image to record body feature information corresponding to the body image,
wherein when the processor loses the real face image while tracking the sound source, the processor further ensures that the central position of the close-up conference image corresponds to the sound source according to the body feature information.

4. The video conference system of claim 2, wherein when the processor determines that the real face image exists in the sub-image block of the conference image corresponding to the sound source according to the positioning signal, if the processor further determines that a specific object image is included around the real face image in the conference image, the processor adjusts the close-up conference image, so that the close-up conference image includes the real face image and the specific object image.

5. The video conference system of claim 1, wherein the processor determines whether a wink feature exists in a face image of the sub-image block of the conference image corresponding to the sound source according to the positioning signal to determine whether the face image is the real face image.

6. The video conference system of claim 1, wherein the image detection device is a 360 degree panoramic camera, and the processor divides the conference image into a plurality of sub-image blocks, wherein when the sound source detection device detects the sound source in the conference space, the processor selects one of the sub-image blocks according to the positioning signal to determine whether the real face image exists in the one of the sub-image blocks.

7. The video conference system of claim 1, wherein the processor pre-analyzes the conference image to determine a plurality of face images in the conference image, and when the sound source detection device continuously detects that the sound generated by the sound source in the conference space is multiple sound sources state or a no obvious sound source state exceeded a preset time length, the processor adjusts the close-up conference image, so that the close-up conference image includes the face images.

8. The video conference system of claim 1, wherein the processor pre-analyzes the conference image to determine a plurality of face images in the conference image, and when the sound source detection device detects the sound generated by the sound source in the conference space for less than a preset time length, or in both a multiple sound sources state and a no obvious sound source state, the processor adjusts the close-up conference image, so that the close-up conference image covers the face images of a majority of conference members or displays an image of a preset location.

9. The video conference system of claim 1, wherein the sound source detection device is a microphone array, and the sound source detection device determines whether a sound intensity of the sound source exceeds a sound intensity threshold to output the positioning signal to the processor.

10. The video conference system of claim 1, wherein the video conference apparatus further comprises an input/output interface, and the input/output interface comprises a video and audio interface, wherein the display apparatus and the video conference apparatus are disposed in the same conference space, and the processor outputs the image signal to the display apparatus via the video and audio interface.

11. The video conference system of claim 1, wherein the video conference apparatus further comprises an input/output interface, and the input/output interface comprises a communication interface, wherein the display apparatus and the video conference apparatus are disposed in different conference spaces, and the processor outputs the image signal to the display apparatus via the communication interface.

12. The video conference system of claim 1, wherein when the sound source detection device detects a plurality of sound sources in the conference space, the sound source detection device outputs a plurality of positioning signals to the processor, and the processor determines whether a plurality of real face images respectively exist in a plurality of sub-image blocks of the conference image corresponding to the sound sources according to the positioning signals, so that the display apparatus displays a plurality of close-up conference images including the real face images simultaneously on a plurality of split screens in one screen.

13. A video conference apparatus having an image detection device, a sound source detection device and a processor, wherein
  the image detection device is configured to obtain a conference image of a conference space;
  the sound source detection device is configured to detect a sound generated by a sound source in the conference space and output a positioning signal; and
  the processor is coupled to the image detection device and the sound source detection device, and configured to receive the positioning signal,
  wherein the processor determines whether a real face image exists in a sub-image block of the conference image corresponding to the sound source to output an image signal to a display apparatus, so that the display apparatus displays a close-up conference image including the real face image according to the image signal,
  wherein the processor is further configured to perform a calibration operation on the image detection device and the sound source detection device, so that image coordinates of the image detection device are consistent with sound coordinates of the sound source detection device.

14. The video conference apparatus of claim 13, wherein the real face image is located at a central position of the close-up conference image, and the processor tracks the sound source through the sound source detection device to ensure that the real face image is displayed at the central position of the close-up conference image when a location of the sound source changes.

15. The video conference apparatus of claim 14, wherein when the processor determines that the real face image exists in the sub-image block of the conference image corresponding to the sound source according to the positioning signal, the processor further analyzes a body image corresponding to the real face image to record body feature information corresponding to the body image,
  wherein when the processor loses the real face image while tracking the sound source, the processor further ensures that the central position of the close-up conference image corresponds to the sound source according to the body feature information.

16. The video conference apparatus of claim 14, wherein when the processor determines that the real face image exists in the sub-image block of the conference image corresponding to the sound source according to the positioning signal, if the processor further determines that a specific object image is included around the real face image in the conference image, the processor adjusts the close-up conference image, so that the close-up conference image includes the real face image and the specific object image.

17. The video conference apparatus of claim 13, wherein the processor determines whether a wink feature or a mouth change or movement exists in a face image of the image block of the conference image corresponding to the sound source according to the positioning signal, so as to determine whether the face image is the real face image.

18. The video conference apparatus of claim 13, wherein the image detection device is a 360 degree panoramic camera, and the processor divides the conference image into a plurality of sub-image blocks, wherein when the sound source detection device detects the sound source in the conference space the processor selects one of the sub-image blocks according to the positioning signal, so as to determine whether the real face image exists in the one of the sub-image blocks.

19. The video conference apparatus of claim 13, wherein the processor pre-analyzes the conference image to determine a plurality of face images in the conference image, and when the sound source detection device detects the sound generated by the sound source is a multiple sound sources state or a no obvious sound source state in the conference space exceed a preset time length, the processor adjusts the close-up conference image, so that the close-up conference image includes the face images.

20. The video conference apparatus of claim 13, wherein the processor pre-analyzes the conference image to determine a plurality of face images in the conference image, and when the sound source detection device detects the sound generated by the sound source in the conference space for less than a preset time length, or in both a multiple sound sources state and a no obvious sound source state, the processor adjusts the close-up conference image, so that the close-up conference image covers the face images of a majority of conference members or displays an image of a preset location.

21. The video conference apparatus of claim 13, wherein the sound source detection device is a microphone array, and the sound source detection device determines whether a sound intensity of the sound source exceeds a sound intensity threshold to output the positioning signal to the processor.

22. The video conference apparatus of claim 13, wherein the video conference apparatus further comprises an input/output interface, and the input/output interface comprises a video and audio interface, wherein the display apparatus and the video conference apparatus are disposed in the same conference space, and the processor outputs the image signal to the display apparatus via the video and audio interface.

23. The video conference apparatus of claim 13, wherein the video conference apparatus further comprises an input/output interface, and the input/output interface comprises a communication interface, wherein the display apparatus and the video conference apparatus are disposed in different conference spaces, and the processor outputs the image signal to the display apparatus via the communication interface.

24. The video conference apparatus of claim 13, wherein when the sound source detection device detects a plurality of sound sources in the conference space, the sound source detection device outputs a plurality of positioning signals to the processor, and the processor determines whether a plurality of real face images respectively exist in a plurality of sub-image blocks of the conference image corresponding to the sound sources according to the positioning signals, so that the display apparatus displays a plurality of close-up conference images including the real face images simultaneously on a plurality of split screens in one screen.

25. A video conference method, comprising:
obtaining a conference image of a conference space by an image detection device;
detecting a sound generated by a sound source in the conference space by a sound source detection device, and outputting a positioning signal by the sound source detection device;
receiving the positioning signal and determining whether a real face image exists in a sub-image block of the conference image corresponding to the sound source by a processor according to the positioning signal to output the image signal;
displaying a close-up conference image including the real face image by a display apparatus according to the image signal; and
performing a calibration operation on the image detection device and the sound source detection device by the processor, so that image coordinates of the image detection device are consistent with sound coordinates of the sound source detection device.

26. The video conference method of claim 25, wherein the real face image is located at a central position of the close-up conference image, and the step of displaying the close-up conference image including the real face image by the display apparatus according to the image signal comprises:
tracking the sound source through the sound source detection device by the processor to ensure that the real face image is displayed at the central position of the close-up conference image when a location of the sound source changes.

27. The video conference method of claim 26, further comprising:
further analyzing a body image corresponding to the real face image by the processor to record body feature information corresponding to the body image; and
when the processor loses the real face image while tracking the sound source, further ensuring that the central position of the close-up conference image corresponds to the sound source by the processor according to the body feature information.

28. The video conference method of claim 26, further comprising:
if the processor further determines that a specific object image is included around the real face image in the conference image, adjusting the close-up conference image by the processor, so that the close-up conference image includes the real face image and the specific object image.

29. The video conference method of claim 25, wherein the step of determining whether the real face image exists in the sub-image block of the conference image corresponding to the sound source by the processor according to the positioning signal to output the image signal comprises:
determining whether a wink feature exists in a face image of the sub-image block of the conference image corresponding to the sound source by the processor according to the positioning signal, so as to determine whether the face image is the real face image.

30. The video conference method of claim 25, wherein the image detection device is a 360 degree panoramic camera, and the step of determining whether the real face image exists in the sub-image block of the conference image corresponding to the sound source by the processor according to the positioning signal to output the image signal comprises:
dividing the conference image into a plurality of sub-image blocks by the processor; and
when the sound source detection device detects the sound source in the conference space, selecting one of the sub-image blocks by the processor according to the positioning signal, so as to determine whether the real face image exists in the one of the sub-image blocks.

31. The video conference method of claim 25, further comprising:
pre-analyzing the conference image by the processor to determine a plurality of face images in the conference image; and
when the sound source detection device detects the sound generated by the sound source in the conference space is a multiple sound sources state or a no obvious sound source state for exceed a preset time length, adjusting the close-up conference image by the processor, so that the close-up conference image includes the face images.

32. The video conference method of claim 25, further comprising:
pre-analyzing the conference image by the processor to determine a plurality of face images in the conference image; and
when the sound source detection device detects the sound generated by the sound source in the conference space for less than a preset time length, or in both a multiple sound sources state and a no obvious sound source state, the processor adjusts the close-up conference image, so that the close-up conference image covers the face images of a majority of conference members or displays an image of a preset location.

33. The video conference method of claim 25, wherein the sound source detection device is a microphone array, and the step of outputting a positioning signal by the sound source detection device comprises:
determining whether a sound intensity of the sound source exceeds a sound intensity threshold and outputting the positioning signal by the sound source detection device.

34. The video conference method of claim 25, wherein the video conference apparatus further comprises an input/output interface, and the input/output interface comprises a video and audio interface, wherein the display apparatus and the video conference apparatus are disposed in same conference space, and the processor outputs the image signal to the display apparatus via the video and audio interface.

35. The video conference method of claim 25, wherein the video conference apparatus further comprises an input/output interface, and the input/output interface comprises a communication interface, wherein the display apparatus and the video conference apparatus are disposed in different conference spaces, and the processor outputs the image signal to the display apparatus via the communication interface.

36. The video conference method of claim 25, further comprising:
outputting a plurality of positioning signals to the processor by the sound source detection device when the sound source detection device detects a plurality of sound sources in the conference space; and
determining whether a plurality of real face images respectively exist in a plurality of sub-image blocks of the conference image corresponding to the sound sources by the processor according to the positioning signals, so that the display apparatus displays a plurality of close-up conference images including the real face images simultaneously on a plurality of split screens in one screen.

\* \* \* \* \*